United States Patent
Sandoval et al.

(10) Patent No.: US 7,417,986 B1
(45) Date of Patent: Aug. 26, 2008

(54) SHARED BUFFER SWITCH INTERFACE

(75) Inventors: John Sandoval, Santa Clara, CA (US);
Matt Noel, Boulder Creek, CA (US);
Eugene Wang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 976 days.

(21) Appl. No.: 09/947,184

(22) Filed: Sep. 4, 2001

(51) Int. Cl.
*H04L 12/28* (2006.01)

(52) U.S. Cl. .................... 370/381; 370/390; 370/395.7; 370/412; 370/429

(58) Field of Classification Search .................. 370/235, 370/390, 412, 413, 414, 415, 416, 417, 418, 370/381, 395.7; 709/213, 214, 215, 216
See application file for complete search history.

(56) References Cited

U.S. PATENT DOCUMENTS

| | | | | |
|---|---|---|---|---|
| 4,041,461 A | * | 8/1977 | Kratz et al. ................. 712/10 |
| 4,450,525 A | * | 5/1984 | Demuth et al. .............. 712/243 |
| 5,610,914 A | * | 3/1997 | Yamada .................. 370/395.72 |
| 5,898,687 A | * | 4/1999 | Harriman et al. ............ 370/390 |
| 6,052,376 A | * | 4/2000 | Wills .......................... 370/419 |
| 6,272,567 B1 | * | 8/2001 | Pal et al. ....................... 710/56 |
| 6,341,302 B1 | * | 1/2002 | Celis .......................... 718/100 |
| 6,363,081 B1 | * | 3/2002 | Gase .......................... 370/466 |
| 6,487,202 B1 | * | 11/2002 | Klausmeier et al. ...... 370/395.1 |
| 7,046,625 B1 | * | 5/2006 | Kasper ....................... 370/230 |

* cited by examiner

*Primary Examiner*—Chi H. Pham
*Assistant Examiner*—Shick Hom
(74) *Attorney, Agent, or Firm*—Blakely, Sokoloff, Taylor & Zafman LLP

(57) ABSTRACT

A system and method for using a single shared buffer to service multiple destinations for a telecommunications switch is disclosed. Upon receiving a cell of data to be sent to a destination, an interface stores the cell in a shared buffer. The address of the cell in the buffer is stored in a queue array. The address of the buffer address in the queue array is stored in a head array and a tail array. A threshold register tracks the global threshold for the total number of cells in the shared buffer and a destination threshold for each destination. The buffer can broadcast a data cell to a single location or send the same cell to multiple locations.

32 Claims, 4 Drawing Sheets

SHARED BUFFER SWITCH INTERFACE

FIELD OF THE INVENTION

The field of the invention relates to telecommunication switches. More specifically, it relates to the use of buffers in switch interfaces.

BACKGROUND OF THE INVENTION

Hardware that interfaces to a switch needs to buffer ingress cells before sending them to the switch. This buffering is required because the switch must first grant permission for the cell before the cell can be sent to the switch. After receiving the cell, the switch will route the cell to the final destination.

The buffers are temporary holding areas whose drain rate is normally greater than the fill rate. The cells in these buffers are waiting for a latent period between cell arrival and the chance to deliver the cells to the switch. Thus the number of cells in these buffers is directly proportional to the amount of traffic being sent into the switch.

For certain prior art switches, there are dedicated buffers for each destination accessible via the switch. In a given application specific integrated circuit (ASIC) there can be 15 buffers, each of fixed size, which are contained within the chip. In some of the newer ASIC's there are 122 buffers, each larger than in the previous ASIC because of greater latency times. These 122 buffers no longer fit within the ASIC and are implemented in external RAM at greater expense. The trend is toward more buffers.

SUMMARY OF THE INVENTION

A system is described that includes a transmitter to send data. A single buffer stores data received from the transmitter. More than one destination device receives data from this single buffer.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

A system and method are described for increasing the spatial efficiency of a switch interface by decreasing the number of buffers from one per destination to a single buffer. The single buffer is at least the same size as a per-destination buffer. A register array tracks both the global threshold of the buffer and the destination thresholds of each destination. A queue array tracks where each destination's data cell information is being stored in the buffer. A head and tail array tracks where each destination is in the queue array.

Figure 1:
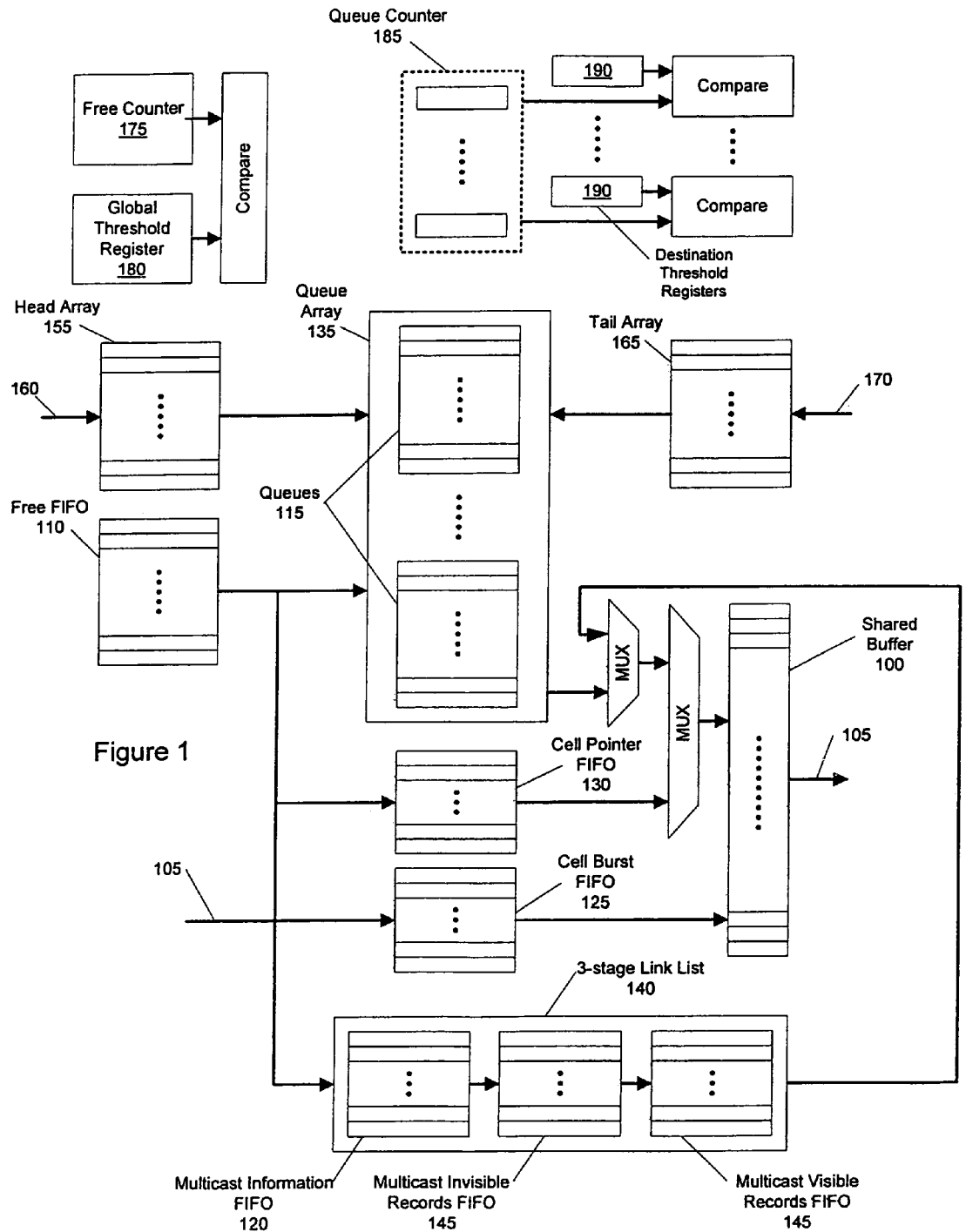
FIG. 1 illustrates the circuit diagram for the entire buffer system.

One embodiment of a system using a single buffer to send information to multiple destinations is illustrated in the circuit diagram of FIG. 1. The circuit illustrated in FIG. 1 is capable of performing both unicast and multicast cell sequence. The shared buffer 100 is shared by all the destination addresses. The buffer 100 can hold a given number of data cells 105. The number of cells the shared buffer 100 can hold should be at least equal to if not greater than the number of cells available in a per-destination buffer. The cells belonging to any destination do not necessarily occupy contiguous cell locations. The maximum number of cells belonging to any destination is configurable.

In one embodiment, the free first-in-first-out (FIFO) 110 contains the address of vacant cells in the shared buffer 100. As a FIFO, the addresses are read out in the same sequence in which they were written. After power-on, this FIFO 110 is initialized with unique values. When a cell arrives, an entry is removed from the FIFO 110 and placed in either a queue 115 or a multicast information FIFO 120. When a cell departs, the address associated with the cell is returned to the free FIFO 110 for reuse.

In a further embodiment, a cell burst FIFO 125 temporarily holds cells until they can be written into the shared buffer 100. The shared buffer 100 is a single ported random access memory (RAM), meaning cells can be either written into the shared buffer 100 or read out of the shared buffer 100. The shared buffer 100 does not allow simultaneous reading and writing of cells. Because a burst of cells arrive at the same time that a burst of cells are being read out of the shared buffer 100, cells from the transmitter are first put into the cell burst FIFO 125, and then moved to the shared buffer 100. At the same time, in one embodiment, a cell pointer FIFO 130 temporarily holds shared buffer 100 addresses. The cell pointer FIFO 130 works in conjunction with the cell burst FIFO 125.

A queue 115 is a FIFO collecting addresses bound for the same destination. Queues 115 are held in the queue array 135. These addresses are used to access the shared buffer 100. When a cell is written to the shared buffer 100, the address associated with the cell is also written into the queue. Later, when the cell is to be read from the shared buffer 100, the address is read from the queue 115 and presented to the shared buffer 100. The shared buffer 100, in turn fetches the cell associated with this address.

In one embodiment, unicast, multicast and control all use the queue array 135. In an alternate embodiment, the unicast and control destinations use the queue array 135, but the multicast does not. Multicast uses a construct that is similar to the queue and is called the "multicast info FIFO" 120. Like the queue, the multicast info FIFO 120 contains shared buffer 100 addresses, but in addition contains information that relates to multicast cells. The multicast info FIFO is part of a 3-stage link list 140. An address in the multicast info FIFO will propagate to the multicast invisible records construct 145, then to the multicast visible records construct 150. Once at the top of the link list 140, the multicast visible records construct 150 presents the address to the shared buffer 100. The shared buffer 100, in turn will fetch the cell associated with this address.

In a further embodiment, a head array 155 keeps track of where to write the next entry in each of the queues. Cell queue numbers 160 are input when the cells are written to the shared buffer 100. The head array 155 contains as many entries as there are queues 115. A tail array 165 keeps track of where to read the next entry in each of the queues. Like the head array 155, the tail array 165 contains as many entries as there are queues 115. A request 170 for cells from a destination causes the tail array 165 to look up the position in the queue array 135 containing the queue 115.

The free counter 175 keeps track of the number vacant cells in the shared buffer 100. In conjunction with the global threshold register 180, the free counter 175 determines whether the shared buffer 100 has available space for cells. When the free counter is equal to or less than the maximum cell capacity minus the global threshold, backpressure is applied to the source of cells. This threshold register prevents the source of cells from over-running the shared buffer 100.

Associated with each queue 115, is a queue counter 185. This counter 185 keeps track of the number of valid entries in the queue 115, i.e. outstanding cells in the shared buffer 100. The counter 185 is incremented when a cell arrives and decremented when a cell departs. In an alternate embodiment, the multicast cells do not use the queue array 135, yet the queue counter 185 assigned to the multicast cells still reflects the number of outstanding multicast cells. The queue counter 185 is used in conjunction with destination threshold registers 190 to apply back-pressure to the source of cells. When the queue counter 185 is equal to the queue threshold in the destination threshold register 190, backpressure is applied to the source of cells for that queue 115. The purpose of the threshold register 190 is to disallow any destination from consuming too much of the shared buffer 100.

Figure 2:
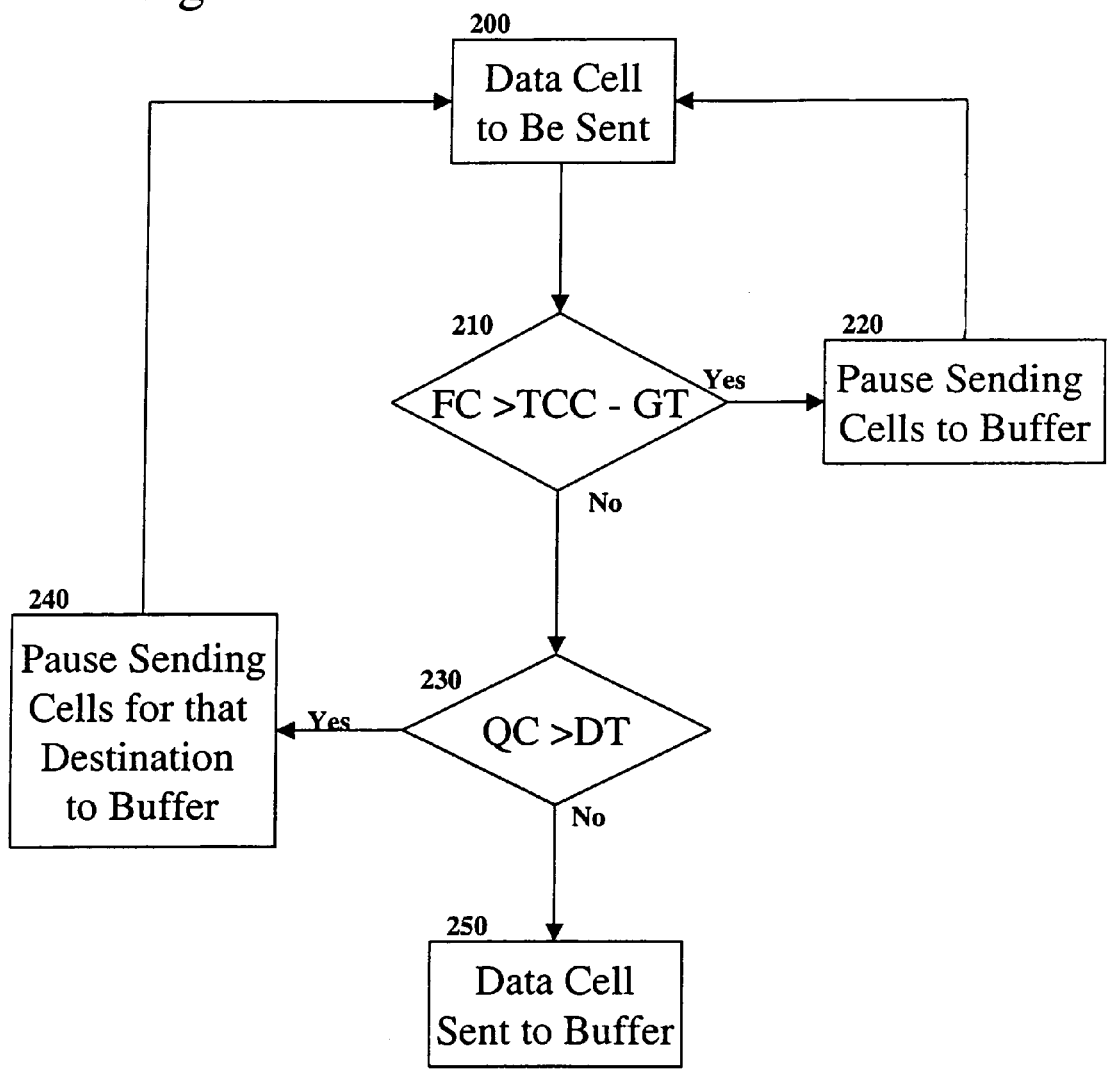
FIG. 2 illustrates in a flowchart the method for administrating thresholds to the buffer.

One embodiment of using threshold registers to prevent buffer overflow is illustrated in the flowchart of FIG. 2. The method starts when a data cell is to be sent to the shared buffer 100 (operation 200). The free counter (FC) 175 is compared with the global threshold (GT) 180 (operation 210). If the FC is equal to or less than the total cell capacity (TCC)-GT, backpressure causes the cell source to pause sending any more cells (operation 220). The queue counter (QC) 185 is compared with the destination threshold (DT) 190 for that cell's destination (operation 230). If the QC is equal to or greater than the DT, backpressure causes the cell source to pause sending any more cells for that destination (operation 240). If neither of these thresholds are breached, cells can be freely sent (operation 250).

Figure 3:
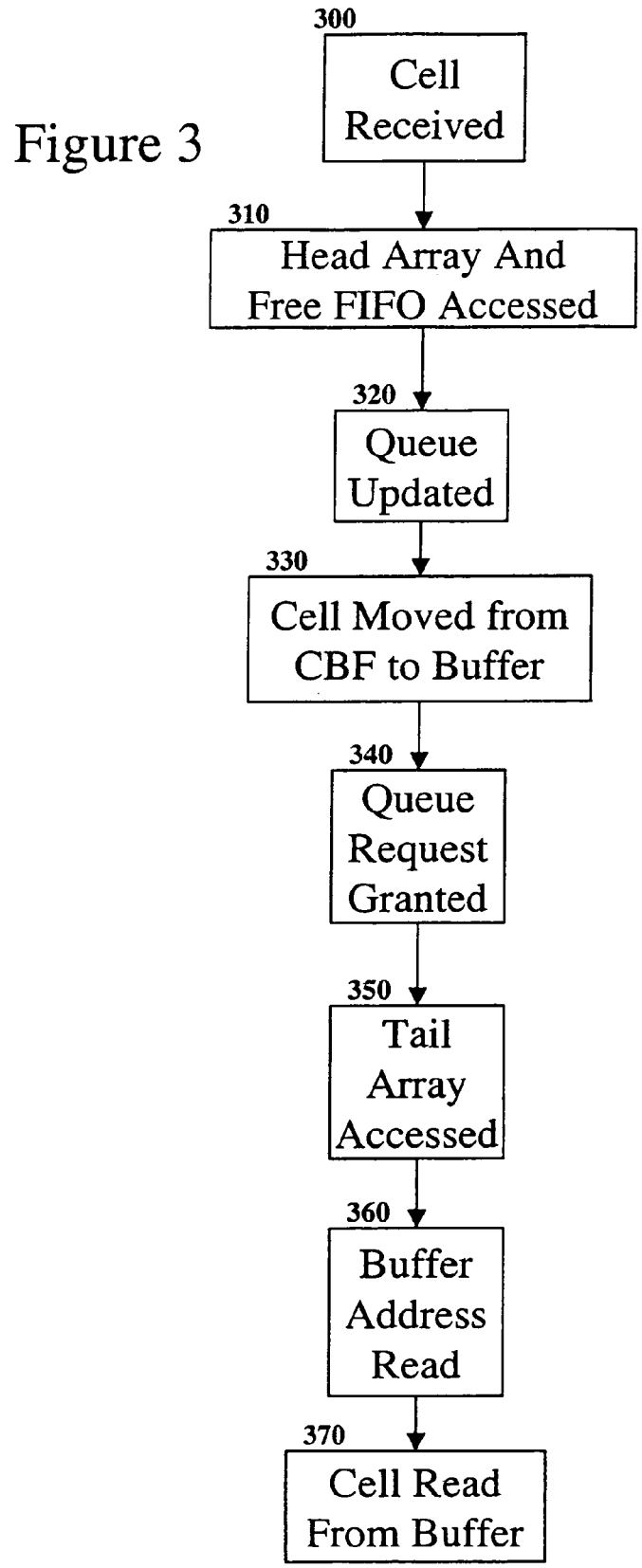
FIG. 3 illustrates in a flowchart the method for performing a unicast cell sequence.

In one embodiment, cells are written to the shared buffer 100 in a unicast, or single cell sequence, illustrated by the flowchart in FIG. 3. A cell is received by the shared buffer system (operation 300). The free FIFO 110 provides the next available address in the shared buffer 100. The hardware stores the address for use when the cell is read out of the shared buffer 100 and sent to the transceiver. That is, the hardware stores the address retrieved from the free FIFO. The queue 115 is the construct that maintains this history of addresses. Therefore, the hardware puts the address retrieved from the free FIFO into the next writeable location in the queue. The address that points to the next writeable entry in the queue 115 is kept in the head array 155. The destination address, associated with the cell, is equivalent to the queue number. The queue number is presented to the head array 155, in order to retrieve the address that points to the next available entry in the queue 115.

The head array and free FIFO are accessed (operation 310). The entry for the queue 115 has been read from the head array 155 and is being presented as the write address to the queue array 135. This address will index the next writeable entry in the queue 115. The next available shared buffer address, retrieved from the free FIFO 110, is presented to the queue array 135 as the write data. The entry for the queue 115 is then incremented and written back into the head array 155, in preparation for the arrival of another cell for the queue 115. The cell is temporarily held in the cell burst FIFO (CBF) 125. The cell data is presented to the CBF as write data. The next available shared buffer 100 address, retrieved from the free FIFO 110, is presented to the cell pointer FIFO 130 as the write data.

The queue is updated on the entry of the new cell operation 320). The counter 185 associated with the queue 115 is incremented to reflect that a new cell has arrived. The free counter 175 is decremented to reflect one less shared address is available for use. The CBF 125 has a new cell and the cell pointer FIFO 130 has a new address.

Using the address held in the cell pointer FIFO 130, the cell is moved from the CBF to the shared buffer (operation 330). Having placed a cell in the shared buffer, the cell can now be requested by the destination.

Once a request for the cell from the destination is granted (operation 340), the placement of the cell is called up from storage in the queue 115. The address that points to the next readable entry in the queue 115 is kept in the tail array 165. The destination address, associated with the cell, is equivalent to the queue number. The queue number is presented to the tail array 165 to retrieve the address pointing to the next readable entry in the queue 115.

The tail array is accessed to find the queue address in the queue array (operation 350). This address will index to the next readable entry in the queue 115. The entry for that queue 115 is then incremented and written back to the queue 115 index in the tail array 165, so that the next request for that queue 115 will access the next cell in that queue 115. The buffer address for the cell is read from the queue (operation 360).

The cell is read to the destination from the buffer (operation 370). The counter 185 associated with queue is decremented to reflect that a cell has departed. The free counter 175 is incremented to reflect one more shared address is available for use. The shared buffer 100 address is returned to the free FIFO 110, for reuse.

Figure 4:
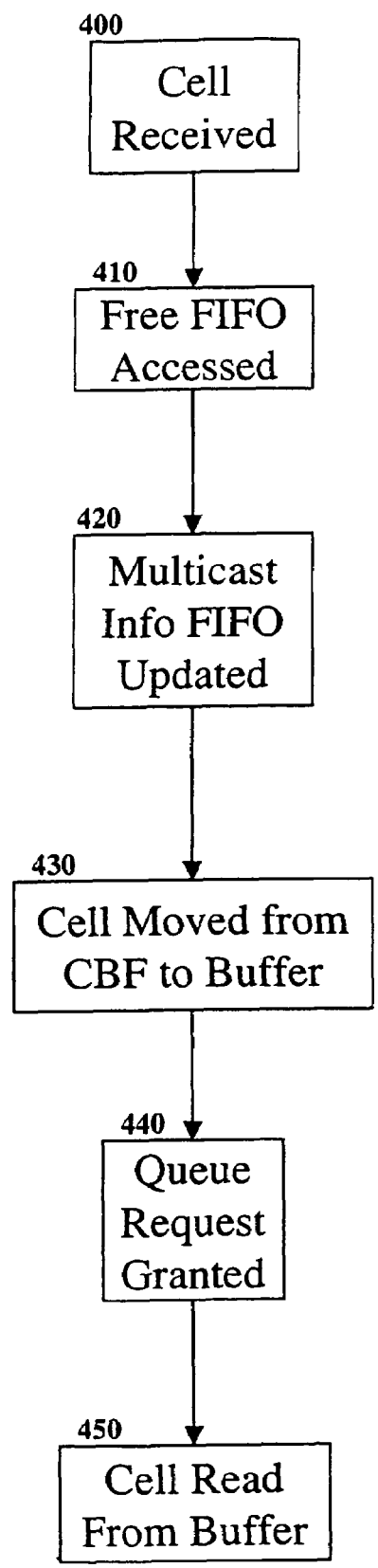
FIG. 4 illustrates in a flowchart the method for performing a multicast cell sequence.

In an alternate embodiment, cells are written to the buffer in a multicast, or multiple cell sequence, illustrated by the flowchart in FIG. 4. A cell is received by the shared buffer system (operation 400). The free FIFO 110 provides the hardware with a destination for the information. The free FIFO 110 is accessed in order to retrieve the next available address in the shared buffer 100. The multicast info FIFO 120 construct maintains a history of addresses retrieved from the free FIFO 110. The hardware puts the address retrieved from the free FIFO 110 into the next writeable location in the multicast info FIFO 120.

The free FIFO is accessed (operation 410). The next available shared buffer address retrieved from the free FIFO 110, is presented to the multicast info FIFO 120 as the write data. The cell is temporarily held in the CBF 125. The cell data is presented to the CBF as write data. Later, the cell data is moved to the shared buffer 100. The next available shared buffer address, retrieved from the free FIFO 110, is also presented to the cell pointer FIFO 130 as the write data.

The multicast info FIFO is updated on the entry of the new cell (operation 420). The counter 185 associated with the queues 115 is incremented to reflect that a new cell has arrived. The free counter 175 has been decremented to reflect one less shared address is available for use. The CBF 125 has a new cell. The cell pointer FIFO 130 has a new address. Using the address held in the cell pointer FIFO 130, the cell data held in the CBF 125 is moved to the shared buffer (operation 430).

A request for the cell from the destination is granted (operation 440). The cell is read from the shared buffer (operation 450). The multicast record link list 140 remembers the location of the cell. The multicast record link list is the construct that maintains a history of shared buffer addresses. The address in the multicast visible records 150 construct is presented to the shared buffer 100.

The cell is read to the destination from the buffer (operation 450). The cell is sent to the receiver. The queue counters 185 are decremented to reflect that a cell has departed. The free counter 175 is incremented to reflect one more shared address is available for use. The shared buffer address is returned to the free FIFO 110 for reuse.

The method described above can be stored in the memory of a computer system (e.g., set top box, video recorders, etc.) as a set of instructions to be executed. The instructions to perform the method described above could alternatively be stored on other forms of machine-readable media, including magnetic and optical disks. For example, the method of the present invention could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the methods as discussed above, could be implemented by additional computer and/or machine readable media, such as discrete hardware components as large-scale integrated circuits (LSI's), application-specific integrated circuits (ASIC's), and firmware such as electrically erasable programmable read-only memory (EEPROM's).

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system comprising:
   a shared buffer to store data cells, wherein the data cells have one or more destinations;
   a queue array coupled with the shared buffer to contain a queue for each of the one or more destinations, the queue array listing locations of the data cells in the shared buffer for the one or more destinations;
   a head array coupled with the queue array to point to a first location in the queue array containing a location in the shared buffer to write a first data cell for the one or more destinations;
   a tail array coupled with the queue array to point to a second location in the queue array containing a location in the shared buffer to read a second data cell for the one or more destinations;
   a cell burst FIFO coupled with the shared buffer to hold a first plurality of received data cells until a second plurality of data cells is read from the shared buffer; and
   a data register to store a data threshold for the shared buffer.

2. The system of claim 1, further comprising a cell pointer FIFO coupled with the shared buffer to hold a plurality of shared buffer addresses corresponding to the first plurality of data cells.

3. The system of claim 2, further comprising a multicast data link list coupled with the shared buffer to hold multicast data, the multicast data link list comprising:
   a multicast information FIFO to hold addresses in the shared buffer for multicast data cells;
   a multicast invisible records FIFO coupled with the multicast information FIFO to propagate the addresses in the shared buffer for the multicast data cells; and
   a multicast visible records FIFO coupled with the multicast invisible record FIFO to present the addresses in the shared buffer for the multicast data cells, wherein the shared buffer is configured to fetch data cells associated with the addresses in the shared buffer for the multicast data cells.

4. The system of claim 1, wherein the data threshold is a global data threshold.

5. The system of claim 4, wherein, when data in the shared buffer is equal to or exceeds the global data threshold, the system applies back-pressure to a source of the data in the shared buffer until the data in the shared buffer falls below the global data threshold.

6. The system of claim 1, wherein the data register stores a plurality of data thresholds.

7. The system of claim 6, wherein the plurality of data thresholds comprises a destination threshold for each destination.

8. The system of claim 7, wherein, when the data in the shared buffer to be sent to a destination is equal to or exceeds the destination threshold for the destination, the system stops receiving data for the destination until the data in the shared buffer falls below the destination threshold.

9. A method comprising:
   storing data cells in a shared buffer, wherein each data cell has one or more destinations;
   queuing addresses, in a queue array, of the data cells in the shared buffer for the one or more destinations;
   pointing to a first location in the queue array containing a location in the shared buffer to write a first data cell for the one or more destinations; and
   pointing to a second location in the queue array containing a location in the shared buffer to read a second data cell for the one or more destinations;
   holding a first plurality of data cells to be written to the shared buffer in a cell burst FIFO until a second plurality of data cells are read from the shared buffer; and
   storing a data threshold for the shared buffer.

10. The method of claim 9, further comprising pointing to a plurality of shared buffer addresses corresponding with the first plurality of data cells to be written to the shared buffer.

11. The method of claim 9, further comprising holding multicast data for the shared buffer in a multicast data link list, wherein said holding comprises:
    holding, in a multicast information FIFO, addresses in the shared buffer for multicast data cells;
    propagating, in a multicast invisible records FIFO, the addresses in the shared buffer for the multicast data cells; and
    presenting, in a multicast visible records FIFO, the addresses in the shared buffer for the multicast data cells; and
    fetching the multicast data cells to the addresses in the shared buffer.

12. The method of claim 9, wherein the data threshold is a global threshold.

13. The method of claim 12, further comprising:
    pausing reception of data to the shared buffer when the data in the shared buffer is equal to or exceeds the global threshold; and
    resuming reception of the data when the data in the shared buffer falls below the global threshold.

14. The method of claim 9, further comprising storing a plurality of data thresholds for the shared buffer.

15. The method of claim 14, wherein the plurality of data thresholds comprises a destination threshold for each destination.

16. The method of claim 15, further comprising:
pausing reception of data for a destination in the shared buffer when the data in the shared buffer earmarked for the destination is equal to or exceeds the destination threshold for the destination; and
resuming reception when the data in the shared buffer falls below the destination threshold.

17. A machine-readable storage medium having instructions thereon, which when read by a machine, cause the machine to perform operations comprising:
storing data cells in a shared buffer, wherein each data cell has one or more destinations;
queuing addresses, in a queue array, of the data cells in the shared buffer for the one or more destinations;
pointing to a first location in the queue array containing a location in the shared buffer to write a first data cell for the one or more destinations; and
pointing to a second location in the queue array containing a location in the shared buffer to read a second data cell for the one or more destinations;
holding a first plurality of data cells to be written to the shared buffer in a cell burst FIFO until a second plurality of data cells are read from the shared buffer; and
storing a data threshold for the shared buffer.

18. The machine-readable storage medium of claim 17, the operations further comprising pointing to a plurality of shared buffer addresses corresponding with the first plurality of data cells to be written to the shared buffer.

19. The machine-readable storage medium of claim 17, the operations further comprising holding multicast data for the shared buffer in a multicast data link list, wherein said holding comprises:
holding, in a multicast information FIFO, addresses in the shared buffer for multicast data cells;
propagating, in a multicast invisible records FIFO, the addresses in the shared buffer for the multicast data cells;
presenting, in a multicast visible records FIFO, the addresses in the shared buffer for the multicast data cells; and
fetching the multicast data cells to the addresses in the shared buffer.

20. The machine-readable storage medium of claim 17, wherein the data threshold is a global threshold.

21. The machine-readable storage medium of claim 20, the operations further comprising:
pausing reception of data to the shared buffer when the data in the shared buffer is equal to or exceeds the global threshold; and
resuming reception of the data when the data in the shared buffer falls below the global threshold.

22. The machine-readable storage medium of claim 17, the operations further comprising storing a plurality of data thresholds for the shared buffer.

23. The machine-readable storage medium of claim 22, wherein the plurality of data thresholds comprises a destination threshold for each destination.

24. The machine-readable storage medium of claim 23, the operations further comprising:
pausing reception of data for a destination in the shared buffer when the data in the shared buffer earmarked for the destination is equal to or exceeds the destination threshold for the destination; and
resuming reception when the data in the shared buffer falls below the destination threshold.

25. An apparatus, comprising:
means for storing data in a shared buffer, wherein each data cell has one or more destinations;
means for queuing addresses, in a queue array, of the data cells in the shared buffer for the one or more destinations;
means for pointing to a first location in the queue array containing a location in the shared buffer to write a first data cell for the one or more destinations; and
means for pointing to a second location in the queue array containing a location in the shared buffer to read a second data cell for the one or more destinations;
means for holding a plurality of cell burst data cells to be written to the shared buffer until a plurality of data cells are read from the shared buffer; and
means for storing a data threshold for the shared buffer.

26. The apparatus of claim 25, further comprising means for holding multicast data for the shared buffer, wherein said means for holding comprises:
means for holding addresses in the shared buffer for multicast data cells;
means for propagating the addresses in the shared buffer for the multicast data cells;
means for presenting the addresses in the shared buffer for the multicast data cells; and
means for fetching the multicast data cells to the addresses in the shared buffer.

27. The apparatus of claim 25, further comprising means for pointing to a plurality of shared buffer addresses corresponding with the first plurality of data cells to be written to the shared buffer.

28. The apparatus of claim 25, wherein the data threshold is a global threshold.

29. The apparatus of claim 28, further comprising:
means for pausing reception of data to the shared buffer when the data in the shared buffer is equal to or exceeds the global threshold; and
means for resuming reception of the data when the data in the shared buffer falls below the global threshold.

30. The apparatus of claim 25, further comprising means for storing a plurality of data thresholds for the shared.

31. The apparatus of claim 30, wherein the plurality of data thresholds comprises a destination threshold for each destination.

32. The apparatus of claim 31, further comprising:
means for pausing reception of data for a destination in the shared buffer when the data in the shared buffer earmarked for the destination is equal to or exceeds the destination threshold for the destination; and
means for resuming reception when the data in the shared buffer falls below the destination threshold.

* * * * *